US 6,740,162 B2

(12) United States Patent
Hüttlin

(10) Patent No.: US 6,740,162 B2
(45) Date of Patent: May 25, 2004

(54) METHOD FOR TREATING PARTICULATE MATERIAL WITH A COATING MEDIUM AND AN APPARATUS FOR CARRYING OUT THE METHOD

(76) Inventor: Herbert Hüttlin, Rüminger Strasse 15, D-79539 Lörrach (DE)

(*) Notice: Subject to any disclaimer, the term of this patent is extended or adjusted under 35 U.S.C. 154(b) by 44 days.

(21) Appl. No.: 10/277,281

(22) Filed: Oct. 22, 2002

(65) Prior Publication Data

US 2003/0091725 A1 May 15, 2003

Related U.S. Application Data

(62) Division of application No. 09/792,844, filed on Feb. 23, 2001, which is a continuation of application No. PCT/EP99/05423, filed on Jul. 29, 1999, now abandoned.

(30) Foreign Application Priority Data

Aug. 25, 1998 (DE) .......................................... 198 38 540

(51) Int. Cl.[7] ................................................ B05C 5/00
(52) U.S. Cl. ........................... 118/303; 118/13; 118/19; 427/2.18
(58) Field of Search ...................... 118/13, 303, 319, 118/320, 19, 20, 28, 417, 418; 427/2.14, 2.18, 212; 366/137.1, 138

(56) References Cited

U.S. PATENT DOCUMENTS

| 1,605,025 A | | 11/1926 | Hildebrandt |
| 3,141,792 A | * | 7/1964 | Lachman et al. ............ 118/697 |
| 4,740,390 A | | 4/1988 | Kulling |
| 5,284,678 A | | 2/1994 | Hirschfeld et al. .......... 427/212 |
| 5,507,871 A | | 4/1996 | Morino et al. .............. 118/680 |
| 5,582,643 A | | 12/1996 | Takei et al. ................... 118/19 |

FOREIGN PATENT DOCUMENTS

| CH | 670053 | 5/1989 |
| CH | 673962 | 4/1990 |
| DE | 1198187 | 8/1965 |
| DE | 1938797 | 2/1971 |
| DE | 2750696 | 6/1978 |
| DE | 4128258 | 2/1993 |
| DE | 19838540 | 3/2000 |
| GB | 1 226 068 | 3/1971 |

* cited by examiner

Primary Examiner—Richard Crispino
Assistant Examiner—Yewebdar Tadesse
(74) Attorney, Agent, or Firm—St. Onge Steward Johnston & Reens LLC

(57) ABSTRACT

An apparatus is provided for treating particulate material with a coating medium, in particular for sugarcoating or film-coating pharmaceutical or food preformed pieces. The apparatus comprises a container drivable to rotate about a rotation axis, a spraying device for spraying the material with the coating medium and supplying means for supplying process air. The container comprises a bottom and an upstanding wall where the rotation axis of the container is substantially vertical and where an inclined return surface is arranged in the container. The return surface extends from an upper region of the container in the direction of an inner diameter region of the bottom. In a method for treating particulate material to be carried out with the apparatus, the material is moved in the container in a continuous circulating motion along the bottom from an inner diameter to an outer diameter region of the container, from there along the upstanding wall from a lower to an upper region of the container and from there along the inclined return surface back to the inner diameter region of the bottom. The material is moved along the bottom and/or along the wall in a centrifugally, tangentially rolling movement with respect to the vertical axis of the container.

20 Claims, 6 Drawing Sheets

Figure 1:
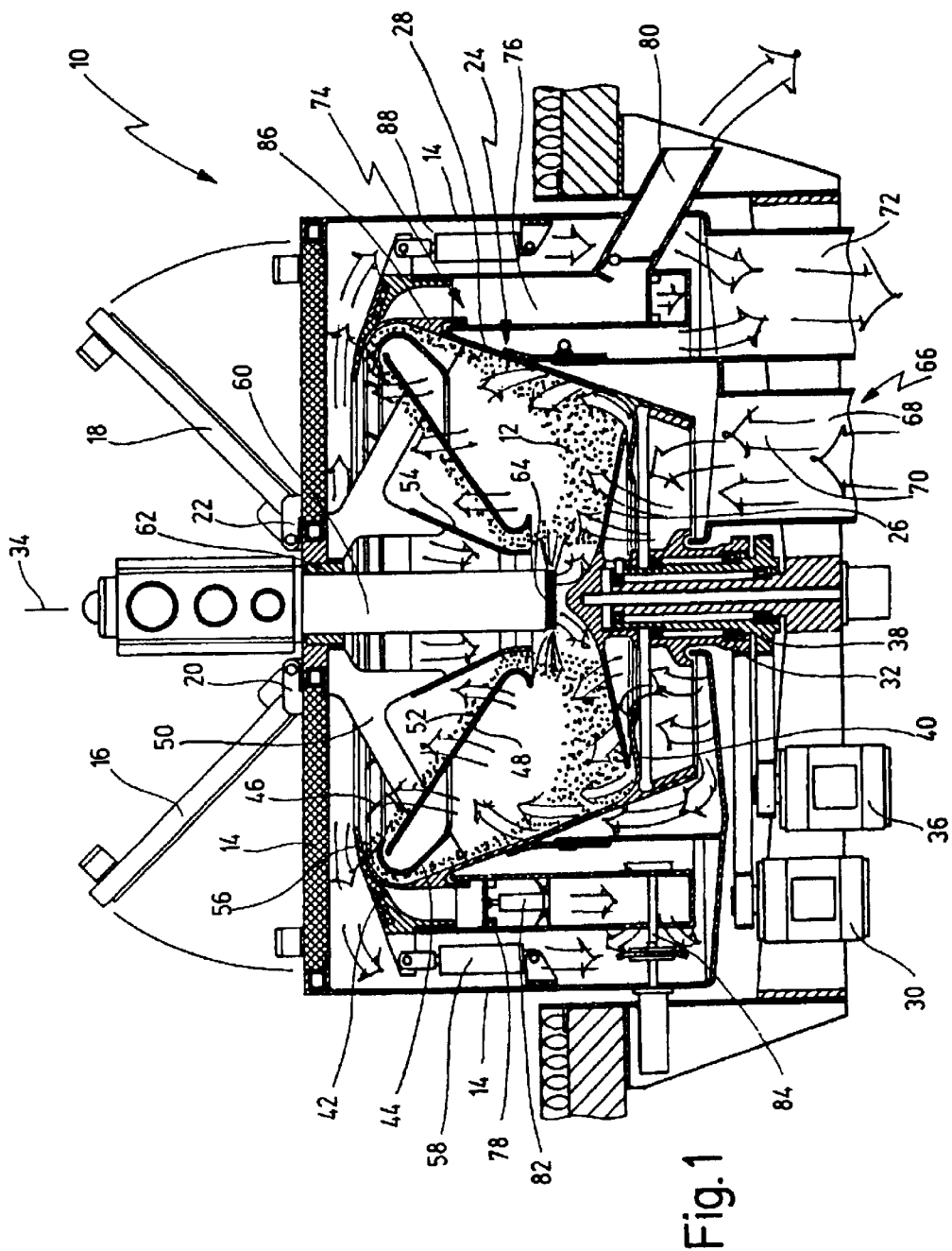

METHOD FOR TREATING PARTICULATE MATERIAL WITH A COATING MEDIUM AND AN APPARATUS FOR CARRYING OUT THE METHOD

CROSS REFERENCE TO PENDING APPLICATION

This application is a divisional of U.S. patent application Ser. No. 09/792,844, filed Feb. 23, 2001 now abandoned, which is a continuation of pending International application PCT/EP99/05423 designating the United States, which has been filed on Jul. 29, 1999.

BACKGROUND OF THE INVENTION

The invention relates to a method for treating particulate material with a coating medium, in particular for sugarcoating or film-coating of pharmaceutical or food preformed pieces, wherein the material is filled into a container, moved in the container by rotating the container, sprayed with the coating medium and the sprayed coating medium is dried by process air.

The invention further relates to an apparatus for carrying out the method comprising a container drivable to rotate about an axis, a spraying device for spraying the coating medium onto the material and supplying means for supplying process air.

Such a method and apparatus are known from the published German patent application DE 1 198 187.

Such methods and apparatus are used in the pharmaceutical, chemical, confectionary and food industries. In the pharmaceutical industry, medications are produced by sugarcoating making use of a sugared syrup. Film or polished tablets are produced on the other hand by film-coating, which are medications coated with a polymer coating.

The present invention however is not limited to sugar-coating or film coatings, but can also be used in granulation, where fine particles are coated with a medium to agglomerate the particles with one another.

In sugarcoating, the preformed pieces are normally coated with a sticky suspension or solution. In conventional methods, the particulate material to be coated is moved in a rotating container and the coating medium, i.e. the sticky suspension is poured onto the moving material in cycles. In further individual cycles, a distribution follows by which the suspension is uniformly distributed on the particulate material and subsequently, the coating medium is dried. These individual cycles each require about 5 to 10 minutes. After drying, the cycles of pouring, distributing, drawing, etc. are repeated.

In more recent methods for sugarcoating, the coating medium is sprayed onto the particulate material moved in the rotating container by means of a spray nozzle system.

In conventional methods of film-coating, the material to be coated is also moved in a rotating container and sprayed with the coating medium through a nozzle system, the coating medium normally being a solution, dispersion or a viscous suspension in the film-coating method. Subsequently, the material is dried.

The quality of the final coating of the particulate material depends on a uniform, rapid, however gentle circulation of the material to be coated, both in the sugarcoating and film-coating procedures. How the material is circulated in the container also has a considerable influence on the possible ways of applying the coating medium and the effectivity of drying. The application and drying in turn significantly influence the quality of the coating of the finally coated material.

A dragée vessel is known from the above-mentioned German patent application DE 1 198 187 for producing dragées for the confectionary and the pharmaceutical industry. A polishing arm is arranged in the dragée vessel which is connected to the open edge of the vessel or is driven by a shaft lying within the drive shaft of the dragée vessel. The dragée vessel is rotatable about an axis which is inclined to the vertical by an angle.

In the method carried out in this known dragée vessel, the material to be coated is moved in a container which is rotated about an inclined axis. The particulate material is circulated within itself due to the rotation of the container about its axis by which the material is mechanically carried along the rotating wall of the container. Thus descending layers of the material flow downwards on the layers ascending on the rotating wall. Due to the inclined disposition of the axis, a horizontal circulating motion is overlapped by upwardly inclined centrifugal forces. A disadvantage of this conventional apparatus is its limited capacity because the inclined disposition of the axis only allows a certain loading. In addition, when the charge amount is enlarged, inadequacies result with the supply of process air for drying the coating, because the process air only superficially passes the material which is circulated as a compact volume, however does not penetrate through the material.

For this reason, the apparatus in use today are almost exclusively those having a container rotated about a horizontal axis. These apparatus can be operated with larger charges. The disadvantage of apparatus with containers rotating about a horizontal axis however is that a mixing of the particulate material is less satisfactory due to the lack of centrifugal forces. This disadvantage is compensated by the use of mixing baffles or blades, which however represent a mechanical obstacle and promotes abrasion and therefore a damaging of the preformed pieces.

An apparatus with a container rotating about a horizontal axis is disclosed in the German product brochure of Glatt GmbH, Bühlmühle, "Glatt-Coater Type GC400-2000".

Moving the particulate material to be coated in a container rotating about a horizontal axis is also a disadvantage with respect to spraying the material with the coating medium. Spraying in the known methods and apparatus of this type takes place either by spraying the medium from above onto the material moving therebelow. This so-called top-spray method however has the drawback that it necessarily leads to large spray losses.

To minimize the spray losses, it has therefore been attempted to immerse the spraying device in the circulating material. In apparatus and methods where the material is moved in a container rotated about a horizontal axis, it has however been found that the movement of the material is negatively influenced by the spraying device immersed in the material itself. A uniform movement and mixing of the particulate material is no longer ensured. Since the immersed, stationary, i.e. non-rotating spraying device again represents a mechanical obstacle to the moving material, the moving particles can be damaged by the mechanical obstacle due to too large friction.

In addition, the published German patent application DE 1 938 797 discloses an apparatus for coating granular material, such as pills, having a container for receiving the granular material and the coating material. The container is formed by a bottom shell rotatable about its middle point and a stationary drum joining with its inner surface to the periphery of the bottom shell smoothly in upward direction. According to the described method, the material to be coated is placed on the bottom shell and rotated at a speed such that the granular material is moved upwardly along the inner surface of the drum by centrifugal forces and from there is moved in circulation back to the bottom shell. The coating material is applied to the granular material circulating in this manner and drying air is blown in between the granular material. In this known apparatus, only the bottom of the container rotates, while the drum is stationary. A disadvantage is that the movement and mixing of the particulate material is insufficient. In addition, the upward moving material caused by centrifugal action flows back in counterflow to the ascending particles in this known method and apparatus. Impacts between the individual particles can cause damage, in particular when the granular particles are brittle. In addition, the ventilation with process air is not optimal in this type of method.

A multistage method is disclosed in the published German patent application DE 27 50 696 for applying a sprayable agent on a material composed of granular, flake, chip or fiber particles. The spray agent is sprayed onto the inner side of a curtain of particles formed to be rotationally symmetric to a vertical axis, which is made up of free falling particles or particles accelerated downwardly. The method is particularly used for coating wood shavings with a sprayable binding agent. The particles forming the curtain are deflected after passing through the direct spray zone and are thrown outwardly from the geometrical axis of the curtain in the form of a circular fan, such that during this ejection movement they are subjected to the action of part of the spray beam penetrating the particle curtain. Thereafter, they are deflected downwardly and treated further or collected and carried off.

An intermediate container bottom rotatable about a vertical axis is provided in this known apparatus, onto which the chips fall from above. By rotation of the intermediate bottom, the chips are thrown to the outside and then fall downwardly, where they then fall out of the container. The container itself in this apparatus, i.e. more precisely the container wall, is formed to be stationary.

An object of the present invention is therefore to provide an improved method and apparatus of the type mentioned at the out-set which avoids the above-mentioned drawbacks and with which the particulate material can be treated with the coating medium in uniformly high quality.

SUMMARY OF THE INVENTION

According to the present invention, the object is achieved by a method for treating particulate material with a coating medium, in particular for sugar coating or film-coating pharmaceutical or food preformed pieces, comprising the steps of:

filling said material into a container;
moving said material in said container by rotating said container;
spraying said coating medium onto said material; and
drying said coating medium sprayed onto said material with process air,
wherein said step of moving said material in said container further comprises moving said material in said container in continuous circulating motion along a bottom of said container from an inner diameter to an outer diameter region of said container, from there along an upstanding wall of said container from a lower region to an upper region of said container and from there along an inclined return surface back to said inner diameter region of said bottom.

Further, according to the present invention this object is achieved by an apparatus for treating particulate material with a coating medium, in particular for sugar coating or film-coating pharmaceutical or food preformed pieces, comprising:

a container drivable to rotate about an axis;
a spraying device for spraying said coating medium onto said material; and
supplying means for supplying process air,
wherein said rotation axis is substantially vertical, and wherein said container further comprises:
a bottom;
an upstanding wall; and
an inclined return surface arranged in said container which extends from an upper region of said container in direction of an inner diameter region of said bottom.

The method and apparatus according to the present invention depart from the concept that the material is to be moved and therefore mixed in a container rotating about a horizontal or inclined axis. Instead, according to the present invention, the particulate material is moved in a container rotating about a vertical rotation axis. The advantage is that centrifugal forces are exploited to move the material, which circulate the material in a centrifugally tangentially rolling movement about the vertical rotation axis of the container, along the bottom substantially horizontally or falling off to the outside and moving substantially vertically along the upstanding wall of the container. In the upper region of the container, the direction of movement of the material is deflected into a downward movement along the return surface, whereby with this guidance of the material according to the present invention, the portion of the material ascending along the wall is a mass flow separated from the portion of the material flowing down along the return surface. Thus the material on the whole is moved in a less compact manner, which allows a more efficient drying of the coating medium. A further advantage of this configuration according to the present invention is that the region between the portion of the material moving along the bottom and the portion of the material returning on the return surface provides a space in which a good process air flow and process air mixing can be formed for drying the material. Due to the return surface, which can be arranged to be stationary in the container, i.e. not rotating, and upon which the particulate material preferably flows down under gravity, and due to the continual outward centrifugal movement of the material on the bottom, the further considerable advantage is achieved that the spraying device can be positioned at a particularly favorable location, for example in the center of the container without representing a mechanical obstacle to the movement of the material. The quality of the finished coated material is substantially improved due to the substantially improved gentle mixing of the material in the method and apparatus according to the present invention.

The object underlying the present invention is therefore completely achieved.

In a preferred embodiment of the method, the moving material is sprayed with the coating medium when flowing off of the return surface to the bottom.

In a preferred embodiment of the apparatus, the spraying device comprises at least one spray nozzle arranged in the region between a lower end of the return surface and the bottom.

The feature has the advantage that the spraying takes place at a particularly favourable location, where the material flowing past the spray nozzle can be sprayed with very high uniformity. A further advantage is that the material can be sprayed at an inner diameter region above the bottom, where the material passes by the spray nozzle with a higher density, so that spray losses are minimized.

In a further preferred embodiment of the method, the coating medium is sprayed annularly and radially outwardly onto the material.

In a further preferred embodiment of the apparatus, the spray nozzle is a radially, annularly spraying spray nozzle, in particular a multi-substance nozzle.

The feature has the particular advantage that the material flowing off of the lower end of the return surface can be sprayed uniformly and completely about its periphery. A further advantage of this feature is that the radially sprayed medium can support the radial outwardly directed movement of the material along the bottom. This effect can further be enhanced with the multi-substance nozzle, where additional support air exits the nozzle with the coating medium.

In a further preferred embodiment of the method, the material is moved along the bottom at a different speed compared to the movement along the wall.

In a further preferred embodiment of the apparatus, the bottom of the container can be placed out of contact with the wall and can be driven at a rotary speed independent of the rotary speed of the wall.

This feature has the advantage that a relative rotary speed can be adjusted between the bottom and the wall of the container, which additionally causes a mixing and rolling movement of the material in the transition region between the outer diameter region of the bottom and the lower region of the wall. The bottom and the wall of the container can even be driven in opposite directions to increase the effect. The retention time in the transition region between the bottom and the wall can be increased by the rolling motion of the material, whereby this region is particularly suited as the active drying zone for drying the coating medium.

In a further preferred embodiment of the method, the process air is passed through the material during its movement along the bottom.

In a further preferred embodiment of the apparatus, the supplying means for the process air comprise a supplying channel opening below the bottom, and the bottom is process air permeable in its inner diameter and/or outer diameter region.

The advantage here, in particular in combination with the before mentioned spraying of the material about centrally in the lower region of the container, is that an effective drying is made possible by flowing air through the material directly after spraying. The drying thus takes place in a region of the container in which the material forms a loosened mass of decreasing particle density due to the centrifugal movement, so that the material can be very effectively flowed through with drying air. On the other hand, the air supplied through the bottom can form an air cushion over the bottom, upon which the material can be moved radially outwardly under rotation along the bottom with reduced friction. In the simplest case, the bottom can be configured with perforations to be air permeable.

In a further preferred embodiment of the method, the process air is passed through the material with a radially outwardly directed component.

In a further preferred embodiment of the apparatus, the bottom is formed of a substantially concentric arrangement of several overlying rings of differing diameter wherein adjacent rings partially overlap with a vertical spacing and wherein the diameter of the rings decreases from bottom to top.

The feature has the advantage that the process air passed through the bottom not only can form an air cushion, but also enhances the radial and turning movement of the material along the bottom due to the radially outward process air flow.

In a further preferred embodiment of the method, the process air is passed through the material as it is moved along the wall of the container.

In a further preferred embodiment of the apparatus, the wall is process air permeable at least in its lower region.

The feature has the advantage that the material is also subjected to a process air flow when ascending along the wall, whereby the drying becomes still more effective.

In a further preferred embodiment of the method, the process air is exclusively passed through the material as it is moved along the wall, without the material moved along the bottom being passed by the process air.

In a further preferred embodiment of the apparatus, the supplying means comprise a supplying channel opening in the region of the wall at the side of the bottom, and wherein the wall is process air permeable in this region.

This feature is of particular advantage in the sugarcoating process, because the material sprayed in the central region of the container after flowing off of the return surface is initially moved along the bottom without drying. The coating material sprayed onto the particles can become uniformly distributed during the movement along the bottom through a fulling effect and thus a coating with uniform thickness is achieved.

In a further preferred embodiment of the method, the process air is also passed through the material when moved back along the return surface.

In a further preferred embodiment of the apparatus, the return surface is process air permeable.

This feature further improves the drying effectiveness, because the particulate material after being sprayed with the coating medium undergoes a two-phase drying by the process air, namely a first time on the bottom, if the bottom is process air permeable, at least however a first time when ascending along the wall and a second time when flowing downwardly along the return surface.

In the method, the process air is preferably heated before passing through the material moving back to the bottom.

With respect to the apparatus, preferably a heater for heating the process air is arranged below the return surface.

An advantage is that the process air, having already flown through the material on the bottom and/or on the wall and having taken up moisture from the coating medium, then has a higher capability of absorbing moisture through the heating. This avoids remoisturing of the material during return flow along the return surface and instead an effective drying of the coating medium is achieved.

In a further preferred embodiment of the method, the material is discharged through its centrifugal motion.

The feature has the advantage that the material can be automatically removed from the container after ending of the treatment process.

In a further preferred embodiment of the apparatus, an upper edge of the wall of the container is curved radially inwardly.

The feature has the advantage that the product receives a change in direction of movement and is guided to the return surface along the radially inwardly curved edge of the wall of the container, this through constructively simple measures.

In a further preferred embodiment of the apparatus, an annular guide element is arranged within the container in its upper peripheral region, which is radially spaced from the wall of the container and connected thereto, so that a radially inwardly curved passing gap is formed for the moving material between the annular guide element and the upper peripheral region of the wall.

The feature has the advantage that the material can emerge in the direction of the return surface in a predetermined layer thickness between the annular guide element and the upper radially inwardly curved edge of the wall of the container. Thus the material flows onto the return surface with a defined particle density and subsequently flows pass the spray nozzle. The thrust of the material flowing along the wall upwardly due to centrifugal forces provides a sufficient exit thrust for the material through the passageway or gap.

In a further preferred embodiment of the apparatus, the annular guide element is connected to the wall of the container by means of several guide blades, wherein the guide blades are curved backwardly in rotational direction as seen from bottom to top.

The feature has the advantage that the guide blades in the upper region of the container allow a further mixing of the material before the material falls onto the return surface. In addition, the guide blades together with the mentioned discharging of the material through centrifugal motion allow an automatic conveyance of the material out of the container.

In a further preferred embodiment of the apparatus, a stationary closure ring is arranged above the container extending radially inwardly from the edge of the container and gliding on the edge of the wall.

This closure ring, in particular in conjunction with the before mentioned guide blades, is of advantage because the guide blades deflect the material against the stationary closure ring thereby slowing down the material which favors the falling of the material down onto the return surface.

In a further preferred embodiment of the apparatus, a discharging device is provided for discharging the container comprising an annular space surrounding the container in which a chute is arranged surrounding the container in helical manner, whose upper end is arranged in the region of the edge of the wall of the container.

With this configuration of the discharging device, the possibility is provided to remove the material from the container with centrifugal motion in constructively simple manner. The chute can be equipped with one or more agitators to accelerate the flow of material along the chute.

In a further preferred embodiment, the closure ring closes the upper end of the chute.

The advantage is that it is guaranteed that the material does not inadvertently escape the container during the treatment process.

In a further preferred embodiment, the closure ring can be displaced upwardly away from the edge of the wall.

The feature has the advantage that the closure ring is driven upwardly from the edge of the wall for discharging the material from the container, so that the mentioned guide blades can convey the material under centrifugal motion out of the container.

In a further preferred embodiment, an axially actuatable inlet/outlet air valve is arranged in the annular space of the discharging device.

The feature has the advantage that with the inlet/outlet air valve, either a ventilation and de-dusting of the discharging device is possible with the air or, when switching the valve to inlet air, the material is supported by the inlet air in its discharging motion, wherein the air permeable chute is fluidised.

In a further preferred embodiment of the apparatus, a ring collar is arranged between the spraying device and the return surface, which is radially spaced at a small distance from the spraying device.

The feature has the advantage that the ring collar together with the return surface acts as a funnel-like guide for the material. This guarantees that the material passes by the spray nozzle at a distance at which the coating medium is completely atomized and thus can be optimally applied to the material.

Further advantages can be taken from the following description and the attached drawings.

It will be understood that the above-mentioned and following features are not only applicable in the given combination, but may be used in other combinations or taken alone without departing from the scope of the present invention.

Selected embodiments are shown in the drawings and will be described in more detail below.

BRIEF DESCRIPTION OF THE DRAWINGS

FIG. 1 shows a longitudinal section through a vertical center plane of a first embodiment of the apparatus according to the present invention.

FIG. 2 shows the apparatus in FIG. 1, where parts of the apparatus have been omitted to illustrate details.

FIG. 3 shows the apparatus in FIG. 1 in which further parts have been omitted to illustrate the discharging device of the apparatus.

FIG. 4 shows a sectional representation corresponding to that of FIG. 1 of a second embodiment of the apparatus according to the present invention.

FIG. 5 shows a sectional representation corresponding to that of FIG. 1 of a third embodiment of an apparatus according to the present invention.

FIG. 6 finally shows a sectional representation whose plane is rotated by 90° compared to the sectional plane of FIG. 1 of a fourth embodiment of an apparatus according to the present invention.

DETAILED DESCRIPTION OF PREFERRED EMBODIMENTS

An apparatus generally indicated with the numeral 10 is shown in FIGS. 1 through 3 for carrying out a method for treating a particulate material 12 with a coating medium, where the particulate material 12 is illustrated as individual dots in FIG. 1.

The apparatus 10 comprises an outer substantially cylindrical housing 14 which closes the apparatus 10 to the outside. The apparatus is supported on a base not shown in FIGS. 1 to 3, but illustrated in FIGS. 4 and 5.

The housing 14 can be closed at the top with two covers 16, 18, which are semicircular in plan view and which are made of transparent industrial glass. The covers 16, 18 serve as control doors for observation of the process taking place in the apparatus 10.

The covers 16, 18 are secured to be pivotal on the housing 14 as shown in FIG. 1, namely with hinges 20, 22. Naturally, the covers 16, 18 are closed when the process in the apparatus 10 is running, while they are illustrated in FIG. 1 in the open position to illustrate their pivotability.

A container 24, open to the top, is arranged in the housing 14 to be rotatable.

The container 24 which is the actual working container for the process, has a bottom 26 running substantially horizontally but slightly downwardly toward the outside, as well as an upstanding wall 28. The bottom 26 and the upstanding wall 28 are configured as separate, non-connected parts in the embodiment of FIG. 1. The container 24 on the whole has the form of a rotationally symmetric body.

The upstanding wall 28 is connected to a drive motor 30 by a drive member 32, wherein the wall 28 can be driven to rotate about a vertical rotation axis 34 by the drive motor 30 and the drive member 32.

The bottom 26 is connected by a drive member 38 to a drive motor 36, so that the bottom 26 can also be rotated about the vertical rotation axis 34, namely with a rotary speed which is independently adjustable from the speed of the wall 28.

The drive motors 30 and 36 are independently controllable in step-less manner, wherein the bottom 26 and the upstanding wall 28 can also be rotated counter directionally. The bottom 26 is formed as a completely circumferential disk in the form of a plate, which is inclined slightly downwardly in radial outward direction.

The upstanding wall 28 widens from bottom to top in substantially conical manner. The wall 28 is also fully circumferential. A lower edge 40 of the wall 28 is drawn radially inwardly under an outer peripheral region of the bottom 26. The bottom 26 is also height adjustable with respect to the lower edge 40 of the upstanding wall, for which purpose the drive member 38 is formed as an axial thrust element.

An upper edge 42 of the wall 28 is also drawn in and radially inwardly curved.

The upper edge 42 of wall 28 is fixedly connected to an annular guide element 44 in the form of a plate configured as a collar, which is spaced radially inwardly from the wall in the upper region of the wall 28. At its upper end, the annular guide element 44 is also curved radially inwardly approximately in the form of the upper edge 42 of the wall. The annular guide element 44 extends downwardly with increasing spacing from the wall 28.

Figure 2:
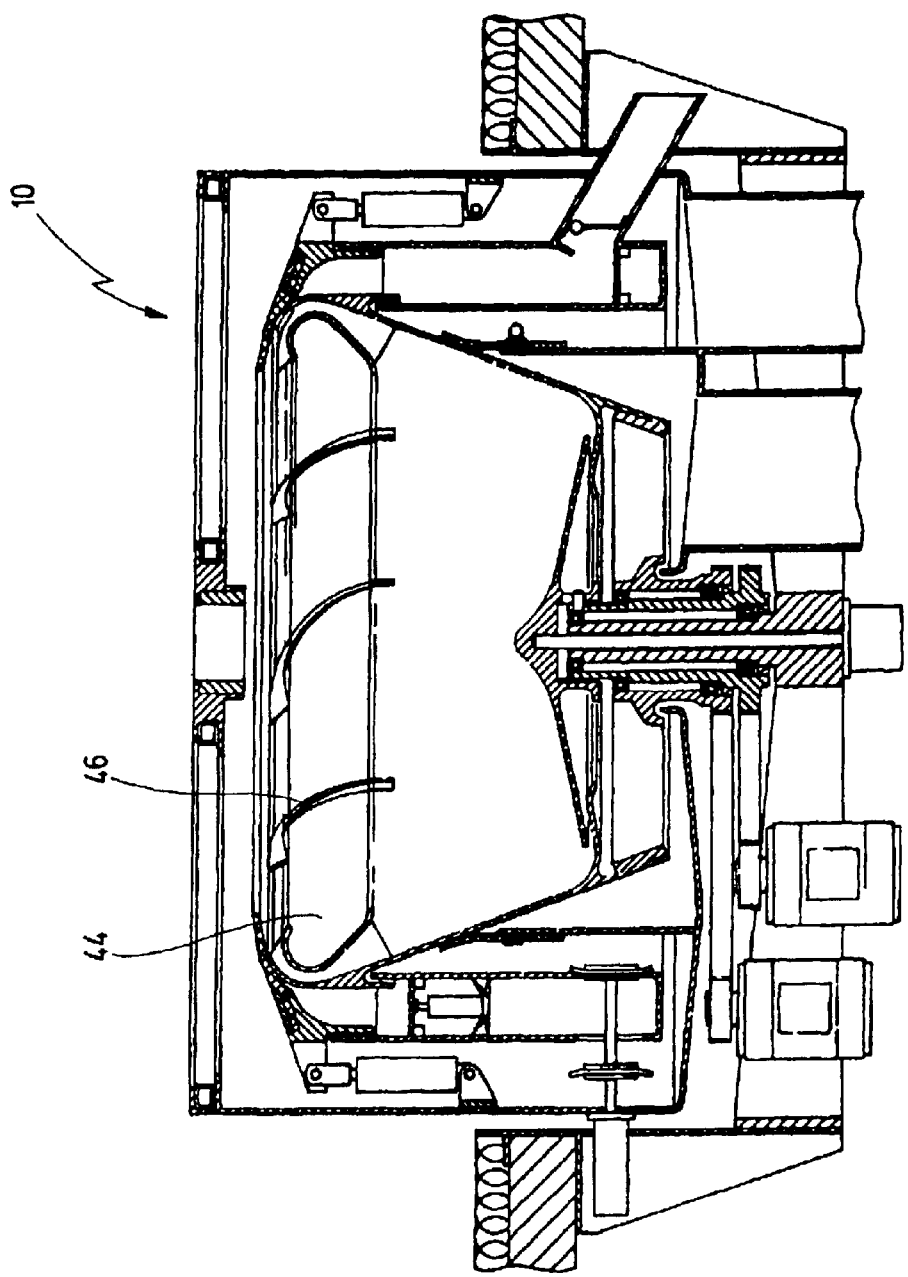

The fixed connection between the annular guide element 44 and the wall 28 is provided by guide blades 46 distributed about the circumference, which are formed as gusset plates, which are curved from bottom to top, and, in rotary direction of the wall 28, which is to the right when seen from above, are backwardly curved as seen in FIG. 2 where the guide element 44 is shown in broken illustration.

A conical element 48 is also arranged in the container 24 which is fixedly connected to the upper portion of the housing by four carrier plates 50 disposed about the circumference. The conical element 48 is thus stationary and does not rotate with the container 24.

The conical element 48 is open to the top and comprises a return surface 52 for the material 12.

The carrier plates 50 also support a ring collar 54 which is arranged within the clearance space of the conical element 48 and which terminates at its lower end at about the same height. The conical element 48 and the ring collar 54 thus form a funnel at the lower end for passage of the particulate material 12.

A closure ring 56 extending radially inwardly with respect to the edge 42 lies on the edge 42 of the wall 28. The closure ring 56, which fully surrounds the upper edge 42, can be adjusted in height by four pneumatic cylinders 58 arranged to be distributed about the circumference, i.e. the closure ring 56 can be displaced out of its position lying on the top of the edge 42 of the wall 28 shown in FIG. 1 upwardly away therefrom. The closure ring 56 is also stationary, wherein the upper edge 42 glides under the closure ring 56 in a manner not permeable for the particulate material 12, when rotating the container 24.

Furthermore, the apparatus 10 comprises a spraying device 60. The spraying device is fixed in a support 62 in the upper region of the housing 14. The spraying device 60 comprises a spray nozzle 64 which immerses vertically at about the center of the container 24 and is spaced from the center of the bottom 26.

The spraying device 60 is supplied externally of the housing 14 with a coating medium with which the material is to be treated. The coating medium is sprayed radially and annularly from the spray nozzle 62 as indicated by the lines 65. The spray nozzle 64 is configured as a multi-substance nozzle for spraying radially and annularly for this purpose. The exit opening of the spray nozzle 64 is located slightly below the lower edge of the conical element 48 or the ring collar 54, where the material 12 flows down from the return surface 52 onto the lower diameter region of the bottom 26.

The apparatus 10 further comprises supplying means 66 for supplying process air. The supplying means 66 include a supplying channel 68 which opens below the bottom 26 of the container 24. The process air is introduced from the outside through the housing 14, where the flow direction is illustrated in FIG. 1 by wide arrows 70.

The bottom 26 is configured to be process air permeable, for example perforated, at its inner diameter and outer diameter regions. The wall 28 of the container 24 is also process air permeable at its lower circumferential region, for example also with corresponding perforations. In addition, the conical element 48 is process air permeable. The conical element 48 can for example be perforated in any manner, or be made of a frame covered with an air permeable fabric. The apparatus 10 also comprises an outlet channel 72 for exhausting the process air.

Figure 3:
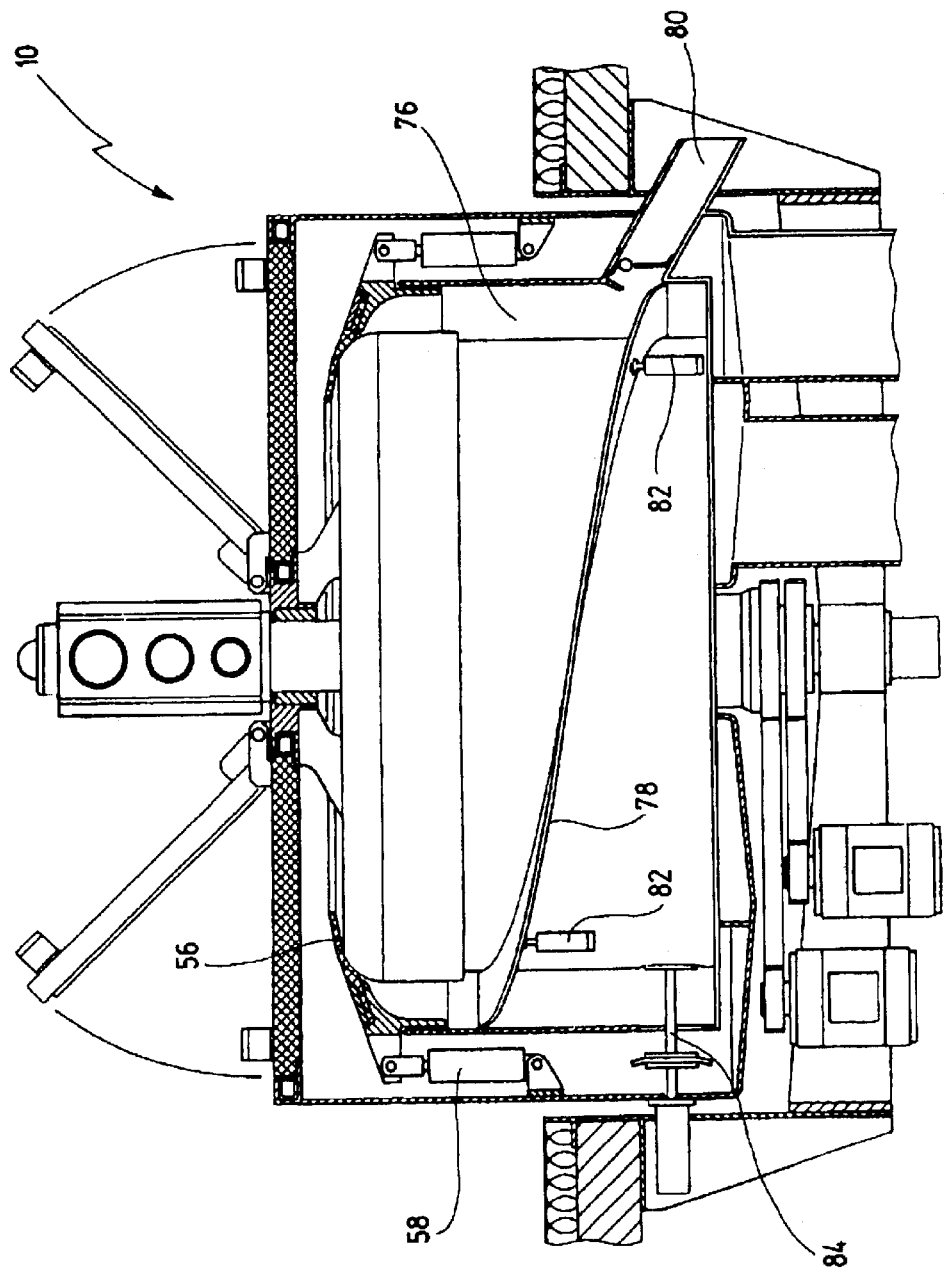

The apparatus 10 further comprises a discharging device 74. The discharging device 74 is formed by an annular space 76 surrounding the circumference of the container 24. A helix-like chute 78 is arranged in the annular space 76, as shown in FIG. 3, where the container 24 and the spraying device 60 are left out. The chute 78 extends in two counter directional sections from an upper end of the annular space 76 at the height of the upper edge 42 of the wall 28 or the closure ring 56. The two sections extend in helical manner each over 180° in both directions down to a discharge tube 80 arranged at the lower end of the annular space 76. The chute 78 is perforated, wherein agitators 82 are arranged under the chute 78 which vibrate the chute 78 to aid the downward flow of the material 12 for discharge.

In addition, an axial inlet/outlet air valve 84 is arranged in the lower region of the annular space 76, which can be switched between inlet air and outlet air to either supply air to the annular space or suction off air therefrom. When exhausting air from the annular space 76 during discharge, dust is removed from the material 12, whereas when feeding air, the flow of the material onto the chute 78 can be accelerated.

Further, an overflow ring 86 is connected to the wall 28 at its upper region which is bent over the inner wall of the annular space 76 and glides on the same when rotating the container 24.

The method for treating the material 12 in the apparatus 10 with the coating medium will now be described in more detail.

Figure 6:
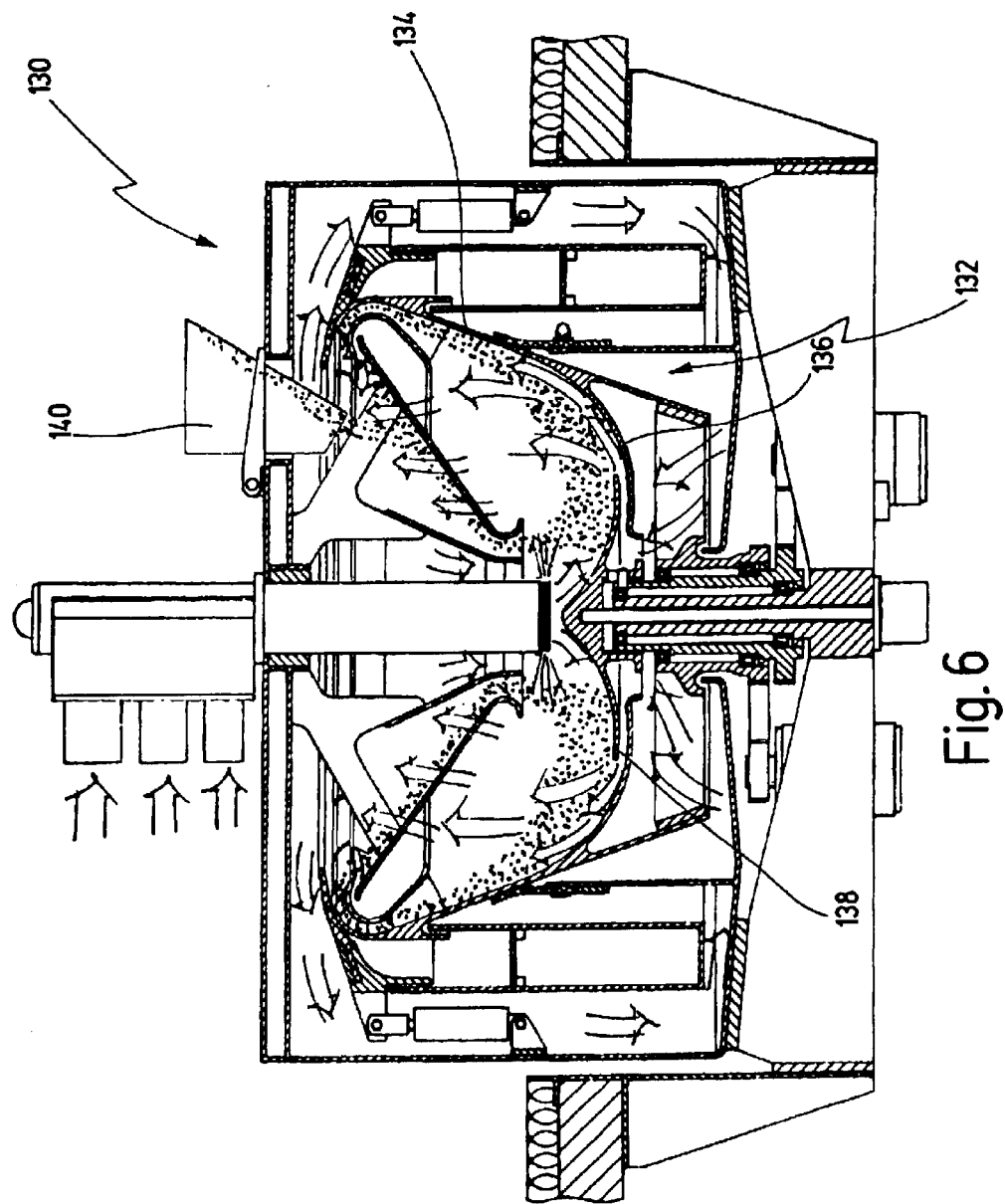

To begin the method, the material 12 is filled from the top from a feed bin (not shown) into the container 24 through a separate closable feed opening not shown in more detail (see FIG. 6, numeral 140). The opening is in the top side of the housing 14 in the region of the support 67.

During the filling process, the container 24, i.e. more precisely the wall 28 and the bottom 26, are set into rotation by the drive motors 30, 36 about the vertical rotation axis 34. The bottom 26 is seated on the lower edge 40 of the wall 28 during filling so that no material particles can escape between the outer circumference of the bottom 26 and the lower edge 40 of the container. The bottom 26 and the wall 28 are therefore driven at the same rotary speed during filling to avoid friction between the two components.

During filling, process air is also supplied through the supplying channel 68 to the apparatus 10 at the so-called filling stage level. During the filling stage, the first dust removing of the particulate material 12 takes place. The particles are moved slowly and very gently because they do not yet have a stabilized surface. All gratings and surface dust, which for example arises in the formation of medical tablets, is suctioned off through the outlet channel 72.

The particulate material is subsequently heated by means of the dry warm process air to the desired temperature. After dust removal, the spraying of the material 12 by the spraying device 60 is activated. Even before starting the process, the spray nozzle 62 is supplied with atomization air and support air to ensure that the coating medium immediately atomizes when exiting the spray nozzle 64, so that it can be optimally applied to the surface of the material 12.

The particulate material 12 during treatment in the container 24 is subject to a continuous circulating movement along the bottom 26 from its inner diameter region to its outer diameter region, from there along the upstanding wall 28 from its lower region to its upper region and from the upper region of the wall 28 via the return surface 52 back to the inner diameter region of the bottom 26. The movement of the particulate material 12 along the bottom 26 and the upstanding wall 28 due to the rotational movement is a centrifugally tangentially rolling movement so that a good mixing of the material 12 is achieved. During this continuous circulating motion, the material 12 is sprayed with the coating medium by the spray nozzle 64 at the lower end of the return surface 52 or slightly therebelow when flowing down to the bottom 26, namely the spraying takes place over the entire circumference of the spray nozzle 64 onto the material 12 flowing past in a ring-collar like curtain. The ring collar 54 ensures that the material 12 flows past the spray nozzle 64 at a small minimal distance from the nozzle, which ensures that the spray cloud has fully developed. As soon as the material 12 after spraying with the coating medium has reached the bottom 26, the material 12 is again moved radially outwardly due to the centrifugal forces caused by the rotating bottom 26.

With the vortex-like ascending of the material 12 on the upstanding wall 28 of the container 24, the material 12 is radially deflected in its movement to the inside by the shape of the upper edge 42 of the wall 28 and the annular guide element 44 at the upper region of the container 24. The guide blades 46 between the upper edge 42 of the wall 24 and the annular guide element 44, which rotate with the wall 28, deflect the material 12 against the underside of the closure ring 56, whereby the material 12 is slowed down at the closure ring 56 and then falls onto the return surface 52 of the conical element 48. The material 12 then flows down the return surface 52 under gravity. The material 12 flowing upwardly along the wall 28 produces a mass thrust, which pushes the flowing material 12 through the annular gap between the upper edge 42 of the wall 28 and the annular guide element 44.

During the continuous spraying process, the circulating material 12 is also continuously dried. For this purpose, the process air supplied through the inlet channel 68 is passed through the bottom 26 and through the material 12 thereabove as illustrated with the arrows 70 in FIG. 1. The process air also passes through the material which has just been sprayed and has fallen down to the inner diameter region of the bottom 26. This configuration of the apparatus 10 and the method is thus particularly suited for film-coating, where the drying process takes place directly after the spraying of the material 12.

A portion of the process air is also passed through the lower region of the wall 28 and through the material 12 ascending along the wall 28. Thus the material 12 is also effectively dried in this region of the circulating motion.

The same process air, which has passed through the material at the bottom 26 or at the wall 28, flows further through the material 12 flowing down on the return surface 52. In this manner, a two-phase drying of the material 12 is achieved during its circulating motion.

The process air which has taken up moisture from the coating medium is finally suctioned off in the outlet channel 72 through an annular space 88 located outside of the annular space 76 of the discharging device 74 in the upper region of the apparatus 10.

As shown in FIG. 1, the material 12 flowing down the return surface 52 does not come into contact with the material moving along the bottom 26 and the wall 28. A turbulent mixing of the air takes place in the space free of material below the conical element 48, i.e. process air which has passed through the material 12 in the inner diameter region just after spraying with the coating medium is mixed with the process air which has passed through the material 12 in the outer diameter region and thus has taken up less moisture because the material in this region has already been pre-dried. The process air passing through the material 12 flowing down the return surface 52 therefore has an average moisture content, which is less than the moisture content of the air passing through the material 12 in the inner diameter region.

As soon as the coating of the material 12 is completed and the required degree of drying is achieved, the material 12 is discharged due to its centrifugal motion through the discharging device 74 in the chute 78 and through the discharge tube 80. For discharge, the closure ring 56 is displaced vertically upward by the pneumatic cylinders 58. The guide blades 46 curved backwardly with respect to the rotary direction then carry the particulate material 12 to the chute 78. The chute 78 can be set into vibration with the agitators 82. In addition, the annular space 76 of the discharging device 76 can be suctioned off by actuating the inlet/outlet air valve 84 to support the discharge movement.

It is also mentioned that during the process, as soon as sufficient process air is present, the bottom 26 can be raised by the drive member 38 configured as an axial thrust element from the lower edge 40 of the wall 28, so that the air can also flow through the gap at the outer circumference of the bottom 26 upwardly along the wall 28 and support the movement of the material 12 along the wall 28. Furthermore, the bottom 26 can be driven at a different speed than the wall 28, where a rolling movement supporting mixing arises in the material 12 in the transition region between the bottom 26 and the wall 28.

Figure 4:
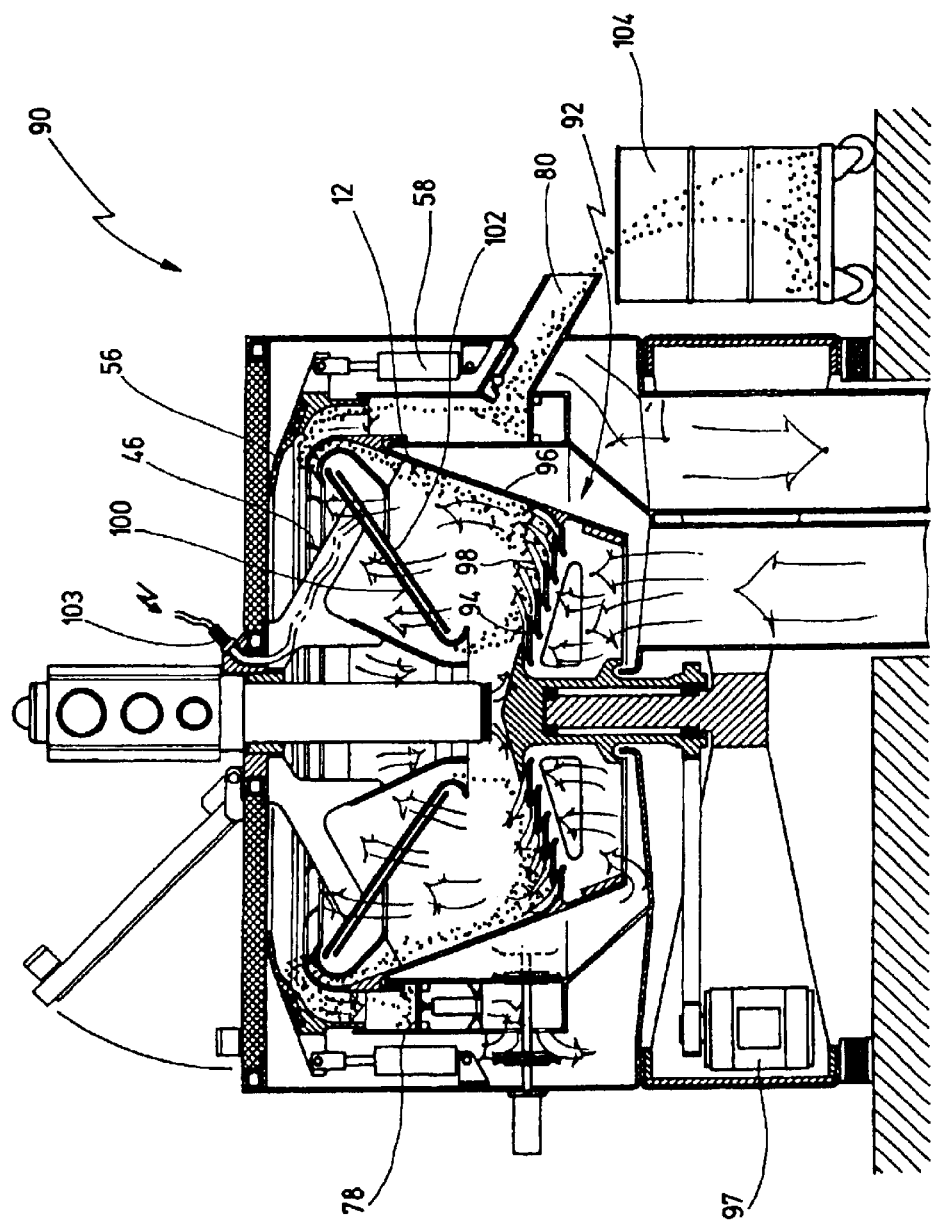

A further embodiment of an apparatus 90 is illustrated in FIG. 4. Only the differences with respect to the above embodiment will be described in the following. Features not differing from those of the embodiment of FIGS. 1 through 3 are indicated with the same reference signs as in FIGS. 1 through 3, when they are required for explanation.

The apparatus 90 comprises a container 92 whose bottom 94 is securely connected to an upstanding wall 96 of the container 92. The bottom 94 and the wall 96 can therefore be driven commonly at the same rotary speed by a single drive motor 97.

The bottom 94 is formed as an arrangement of concentric horizontal overlying rings 98, whose diameters increase from the upper innermost ring to the lowest outermost ring. Respective adjacent rings 98 partially overlap in radial direction and in the overlapping regions form respective annular gaps through which the process air is introduced into the container 92 with a radial component. The radial flow of the air passing through the material 12 supports the radial outwardly directed movement of the material 12 along the bottom 94. The air thus not only forms an air cushion, as in the embodiment of FIG. 1, but additionally supports the movement of the material 12 along the bottom 94.

Furthermore, a heater 102 in the form of an electric heating fabric is arranged under a return surface 100 which is also formed to be conical. The heating fabric is supplied with electricity through an electrical connector. The process air is heated by passing through the heater 102. The relative moisture content of the air is reduced by the heating, which moisture has previously been taken up from the material 12 on the bottom 94. Thus the capacity of the air to take on moisture when passing through the material 12 moving back on the return surface 100 to the bottom 94 is increased. A re-moistening of the material 12 flowing down the return surface 100 caused by moist air is thus avoided and, instead, the material 12 is effectively dried also during return flow.

In a similar embodiment, the conical return surface 100 can be formed of an arrangement of overlying rings as the bottom 94, however with diameters increasing from bottom to top, so that any gaps are created through which the rising air is directed radially inwardly through the return surface 100, where the downward flowing material 12 is thereby accelerated.

The apparatus 90 is illustrated in its discharging operation in contrast to the apparatus 10 in FIGS. 1 through 3. For this purpose, as already mentioned, the closure ring 56 is raised above the wall 96 of the container 92 by the pneumatic cylinders 58. The material 12 is removed through centrifugal motion, transferred by the guide plates 46 to the chute 78 where it flows downwardly in helical manner. The material leaves the container through the discharge tube 80 into a transport container 104. The apparatus 90 of FIG. 4 as with the apparatus 10 is particularly suited for film-coating of pharmaceutical and food preformed pieces.

Figure 5:
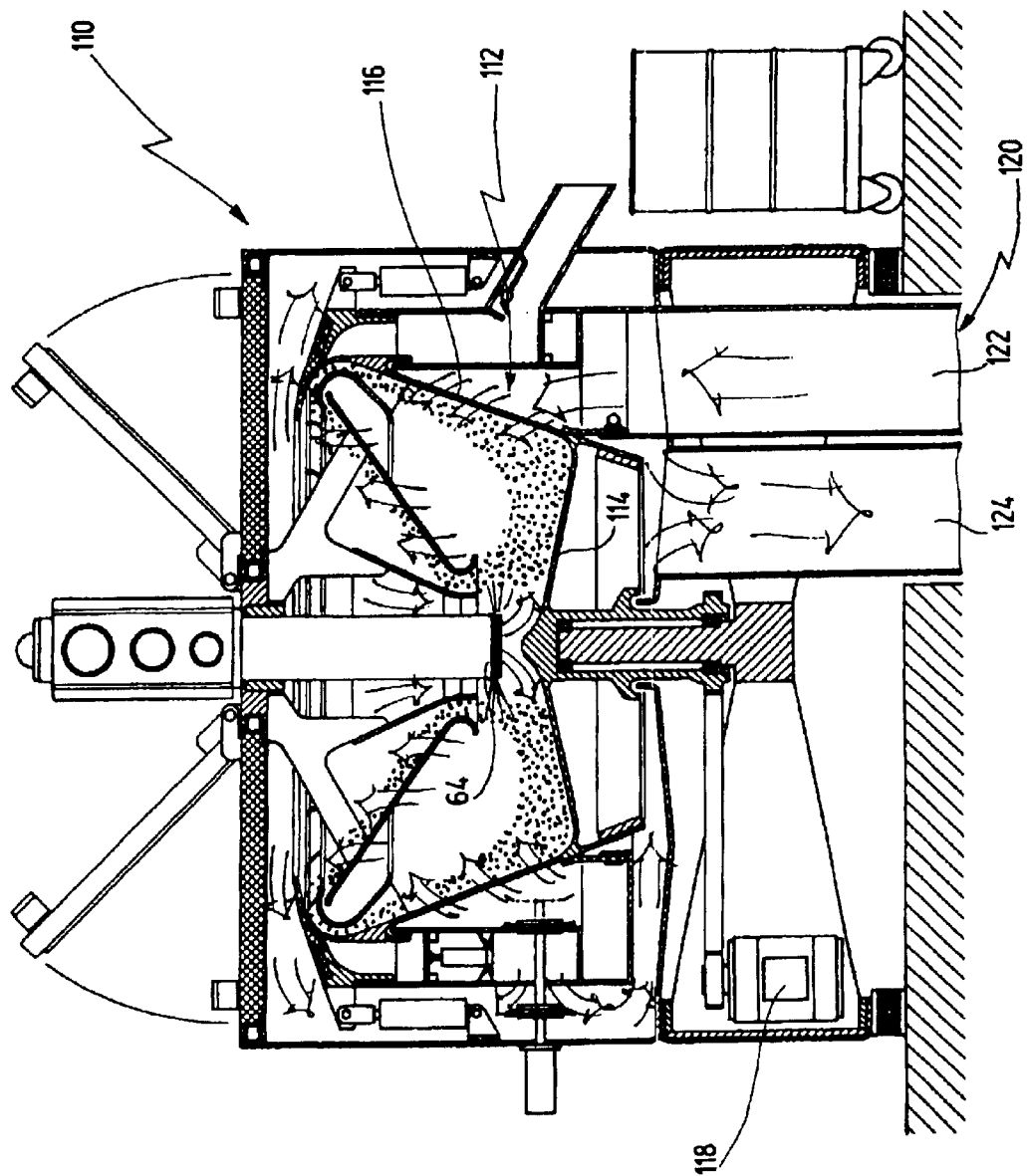

FIG. 5 shows a further embodiment of an apparatus 110. The apparatus 110, as with the previous embodiment, comprises a container 112 whose bottom 114 is fixed to the upstanding wall 116. As in the previous embodiment, only one drive motor 118 is provided for rotary drive of the container 112.

In contrast to the above two embodiments, the apparatus 110 comprises supplying means 120 for supplying process air having supplying channel 122, which opens at the periphery of the wall 116 outside of the circumference of the bottom 114. Whereas the bottom 114 is air impermeable, the process air is introduced through the wall 116 which is process air permeable into the container 112 and passes through the material 12 only when it is moving upwardly along the wall 116.

The portion of the material 12 moving along the bottom 114, which has been sprayed by the spray nozzle 64, is not subjected to the process air flow, so that the previously sprayed coating medium can initially be uniformly distributed on the material 12 without drying. The smooth upper surface of the bottom 114 distributes the sprayed coating medium through mechanical turning effects on the particle surface of the material moving along the bottom 114. The drying of the coating medium then takes place during the movement of the material along the wall 116. With this embodiment, the apparatus 110 is particularly suited for sugarcoating the particles, because it is essential in this process to produce a coating of uniform thickness.

The discharge of the moist process air takes place through an outlet discharge channel 124.

Finally, a further embodiment of an apparatus 130 is shown in FIG. 6, which is particularly suited for sugarcoating the particulate material as is the apparatus 110 in FIG. 5. Compared to the previous illustrations in FIGS. 1 to 5, the apparatus 130 is shown in a cross section rotated by 90°.

The apparatus 130 comprises a container 132 whose upstanding wall 134 has a lower edge 136, which in comparison to the embodiment of FIG. 1 is curved radially further inwards. A bottom 138 in contrast has a smaller diameter than for example the bottom 26 of FIG. 1 whose outer periphery however partially overlaps the lower edge 136 of the wall 134. The bottom 138, as with the embodiment in FIG. 1, is not fixed to the wall 134, but can be rotated independently of the wall 134.

Characteristic of the configuration of the bottom 138 and the lower edge 136 of the wall 134 is that the curved form of the bottom 138 uniformly goes over to the curved form of the lower end 136 of the wall 134, so that the movement of the particulate material 12 in the transition region between the bottom 138 and the wall 134 is continuous and harmonious. The process air is introduced into the moving material 12 through a gap between the outer periphery of the bottom 138 and the lower edge 136 of the wall 134. The air supports the harmonious movement of the material 12 when transferring from the bottom 138 to the wall 134. As in the previous embodiment, the process air flow entering the moving material 12 is spaced from the spray nozzle 64, whereby the material 12 after being sprayed initially is tumbled, so that the coating medium can be uniformly distributed on the particles of the material 12.

To achieve a strong mixing of the material 12 in the region of the transition from the bottom 138 to the wall 134, the bottom 138 is driven at a different speed than the wall 134, so that the relative speed between bottom 138 and the wall 134 produces a rolling movement of the particulate material 12. The bottom 138 can also be driven in opposite direction to the wall 134 to enhance the rolling effect.

A fill bin 140 is also shown in FIG. 6, through which the apparatus 130 can be filled with particulate material 12 as already described in conjunction with FIG. 1.

It will also be understood that the above-described embodiments can be combined with one another, in particular the mentioned containers are interchangeable. Thus a single apparatus is provided which can be rapidly and simply adapted to the particular application, for example sugarcoating or film-coating, by exchanging the container.

I claim:

1. An apparatus for treating particulate material with a coating medium, comprising:
   a container being rotatable about a vertical axis;
   said container including a bottom and an inclined wall;

said inclined wall extending upwardly and outwardly from a vicinity of said bottom;

said bottom being separable from said inclined wall;

said container further including a return surface distinct from said inclined wall; and wherein particulate material being coated cyclically ascends along said inclined wall and descends along said return surface.

2. The apparatus according to claim 1, wherein said bottom being angled downwardly away from a center of said bottom.

3. The apparatus according to claim 1, wherein said bottom, said inclined wall, and said return surface are in fluid communication with one another.

4. The apparatus according to claim 1, said container further comprising a drive member attached to said bottom for controlling a rotation of said bottom.

5. The apparatus according to claim 1, said container further comprising a drive member attached to said inclined wall for controlling a rotation of said inclined wall.

6. The apparatus according to claim 4, further comprising a motor coupled to said drive member drive member of said bottom for controlling a rotation of said bottom.

7. The apparatus according to claim 5, further comprising a motor coupled to said drive member of said inclined wall for controlling a rotation of said inclined wall.

8. The apparatus according to claim 1, further comprising a spraying device for spraying the coating medium onto the particulate material.

9. The apparatus according to claim 1, wherein said return surface is inclined end extends from an upper region of said container toward an inner diameter region of said bottom.

10. The apparatus according to claim 8, wherein said spraying device comprises at least one spray nozzle arranged in a region between a lower end of said return surface and said bottom.

11. The apparatus of claim 10, wherein said spray nozzle is a radially, annularly spraying spray nozzle.

12. The apparatus of claim 10, wherein said spray nozzle is a multi-substance nozzle.

13. The apparatus according to claim 1, further comprising an air inlet below said bottom for supplying air to said container.

14. The apparatus according to claim 1, wherein said bottom is air permeable.

15. The apparatus of claim 1, wherein said bottom is formed of a substantially concentric arrangement of several overlying rings of differing diameter, wherein adjacent rings partially overlap with a vertical spacing and wherein the diameter of said rings decreases from bottom to top.

16. The apparatus of claim 1, further comprising an air inlet in the region of said inclined wall at the side of said bottom, and wherein said inclined wall is process air permeable in this region.

17. The apparatus of claim 1, wherein said return surface is process air permeable.

18. The apparatus of claim 17, further comprising a heater below said return surface for heating said process air.

19. The apparatus of claim 1, further comprising a curved surface connected to an upper region of said inclined wall.

20. The apparatus of claim 1, further comprising an annular guide element in an upper peripheral region of said container which is radially spaced from said inclined wall and connected thereto so that a radially inwardly curved passing gap is formed between said annular guide element and said upper peripheral region of said container.

* * * * *